(12) United States Patent
Matsushita

(10) Patent No.: US 10,025,739 B2
(45) Date of Patent: Jul. 17, 2018

(54) INFORMATION PROCESSING SYSTEM, INFORMATION PROCESSING METHOD, AND RECORDING MEDIUM

(71) Applicant: NEC Corporation, Minato-ku, Tokyo (JP)

(72) Inventor: Junichi Matsushita, Tokyo (JP)

(73) Assignee: NEC CORPORATION, Tokyo (JP)

(*) Notice: Subject to any disclaimer, the term of this patent is extended or adjusted under 35 U.S.C. 154(b) by 259 days.

(21) Appl. No.: 15/016,894

(22) Filed: Feb. 5, 2016

(65) Prior Publication Data

US 2016/0267036 A1 Sep. 15, 2016

(30) Foreign Application Priority Data

Mar. 12, 2015 (JP) ................................ 2015-049048

(51) Int. Cl.
*G06F 13/14* (2006.01)
*G06F 13/368* (2006.01)
*G06F 13/40* (2006.01)

(52) U.S. Cl.
CPC ........ *G06F 13/368* (2013.01); *G06F 13/4022* (2013.01); *G06F 13/4068* (2013.01)

(58) Field of Classification Search
None
See application file for complete search history.

(56) References Cited

U.S. PATENT DOCUMENTS 6,728,249 B2 * 4/2004 Chang ...................... G06F 9/54
370/395.3
6,775,283 B1 * 8/2004 Williams ............ H04L 12/4645
370/392

(Continued)

FOREIGN PATENT DOCUMENTS

JP H09-190402 A 7/1997
JP 2004-128914 A 4/2004

(Continued)

OTHER PUBLICATIONS

Japanese Office Action for JP Application No. 2015-049048 dated Mar. 8, 2016 with English Translation.

*Primary Examiner* — Cheng-Yuan Tseng

(57) ABSTRACT

An information processing system according to the present invention includes: a plurality of processing units; a plurality of input/output units controlled by any one of the processing units; a plurality of first connection units connecting one of the processing units to a first communication channel; a second connection unit connecting the input/output units to a second communication channel; a first mediating unit mediating the second communication channel and a communication network, and transmits identifiers of the input/output units via the communication network; and a plurality of second mediating units mediating a connection between the communication network and the first communication channel, receiving the identifier, and, when an identifier of its own is included in the received identifiers, establishing a connection between the input/output unit with the own identifier and the processing unit and detaches connections between the input/output unit with different identifier and the processing unit.

8 Claims, 7 Drawing Sheets

(56) References Cited

U.S. PATENT DOCUMENTS

| | | | |
|---|---|---|---|
| 7,095,747 B2 * | 8/2006 | Sarmiento | H04L 29/12009 370/352 |
| 7,117,241 B2 * | 10/2006 | Bloch | H04Q 3/0025 370/352 |
| 7,398,328 B2 * | 7/2008 | Arndt | G06F 9/5077 710/1 |
| 7,735,095 B2 * | 6/2010 | Cedola | G06F 13/385 709/227 |
| 8,200,880 B2 * | 6/2012 | Higuchi | G06F 13/4027 370/402 |
| 8,369,362 B2 * | 2/2013 | Abou-Chakra | H04L 29/06 370/503 |
| 8,375,148 B2 * | 2/2013 | Watanabe | G06F 9/45558 710/8 |
| 8,725,926 B2 * | 5/2014 | Baba | G06F 3/0227 710/315 |
| 8,868,710 B2 * | 10/2014 | Schultze | H04L 41/00 370/392 |
| 8,918,493 B1 * | 12/2014 | Beach | G06F 9/5061 709/223 |
| 8,966,199 B2 * | 2/2015 | Nagano | G06F 3/0607 707/634 |
| 9,116,727 B2 * | 8/2015 | Benny | G06F 9/455 |
| 9,344,286 B2 * | 5/2016 | Li | H04L 12/56 |
| 9,348,396 B2 * | 5/2016 | Higuchi | G06F 1/3206 |
| 9,438,503 B2 * | 9/2016 | Coomber | H04L 12/413 |
| 9,542,350 B1 * | 1/2017 | Kissell | G06F 13/4068 |
| 2004/0210623 A1 * | 10/2004 | Hydrie | H04L 12/4641 709/201 |
| 2005/0190788 A1 * | 9/2005 | Wong | H04L 12/4641 370/466 |

FOREIGN PATENT DOCUMENTS

| | | |
|---|---|---|
| JP | 2007-052630 A | 3/2007 |
| JP | 2007-293813 A | 11/2007 |
| JP | 2008-078887 A | 4/2008 |
| WO | 2009/139489 A1 | 11/2009 |
| WO | 2013/136522 A1 | 9/2013 |

* cited by examiner

Fig.5  APPLIED ART

INFORMATION PROCESSING SYSTEM, INFORMATION PROCESSING METHOD, AND RECORDING MEDIUM

This application is based upon and claims the benefit of priority from Japanese Patent Application No. 2015-049048, filed on Mar. 12, 2015, the disclosure of which is incorporated herein in its entirety by reference.

TECHNICAL FIELD

The present invention relates to information processing, particularly relating to an information processing system, an information processing method, and a recording medium, which include input/output devices (IO devices) for processing input and output (IO) of data.

BACKGROUND ART

An information processing system manages resources that have been prepared in advance, as resource pools, so as to ensure processing flexibility. Then, the information processing system extracts and uses a resource from the resource pools according to an operation policy of the information processing system.

As a resource of a management target, there is an input/output device located in a network (for example, refer to Japanese Unexamined Patent Application Publication No. 2008-078887 (hereinafter, referred to as Patent Literature 1)).

An example of such a technique of using IO devices through a network is ExpEther (registered trademark). "ExpEther" is a technique that extends a PCI Express (registered trademark) bus over a network using Ethernet (registered trademark). Use of ExpEther enables an information processing system to use an IO device with a PCI Express interface through Ethernet.

Hereinafter, "ExpEther" will occasionally be abbreviated as "EE."

ExpEther uses an EE Host engine and an EE IO engine so as to connect PCI Express to Ethernet.

The EE IO engine is a processing entity for executing processing for an input/output device (IO device). The EE IO engine includes hardware (for example, a custom Large Scale Integration circuit (LSI) or a dedicated LSI) for connecting PCI Express to Ethernet. It is noted that the IO device that is connected to the EE IO engine is referred to as an EE IO engine-controlled IO device.

Further, the EE Host engine is a processing entity for executing processing for a host. The EE Host engine includes, in the same way as the EE IO engine, hardware (for example, a custom LSI) for connecting PCI Express to Ethernet.

Further, ExpEther allocates an identifier to the IO device that is connected to the EE IO engine (an EE IO engine-controlled IO device).

In the following description, it is supposed that ExpEther uses a Virtual Local Area Network (VLAN) as a virtual network for a connection between a host and an IO device. Thus, such an identifier is also referred to as "VLAN ID (identifier)."

Further, ExpEther also allocates an identifier (VLAN ID) to an EE Host engine.

Then, the EE IO engine connects with the EE Host engine with the same identifier (VLAN ID) as the identifier (VLAN ID) of the IO device that is connected to the EE IO engine (controlled IO device). In the following description, the EE IO engine is also referred to as having the identifier of the controlled IO device.

FIG. 4 is a block diagram illustrating an example of the configuration of the information processing system 40 which includes EE Host engines and EE IO engines.

The information processing system 40 shown in FIG. 4 includes two VLANs that are connected to each other via an L2 switch 470. In other words, the information processing system 40 includes two connections.

The L2 switch 470 is a switch on Layer 2 (L2) of the network layer. The L2 switch 470 is, for example, a network switch using Ethernet.

The first VLAN (VLAN ID=#0) includes a Central Processing Unit (CPU) 410, a root complex 420, and an EE Host engine 430. The first VLAN further includes an EE IO engine 440 and an IO device 460.

The second VLAN (VLAN ID=#1) includes a CPU 411, a root complex 421, and an EE Host engine 431. The second VLAN further includes an EE IO engine 441 and an IO device 461.

The CPU 410 is, for example, a processing unit that is embedded in a server which is not shown. The CPU 410 executes processing that uses an IO device 460 based on a program stored in a storage device which is not shown. That is, the CPU 410 executes processing as a host.

The root complex 420 is a controller that processes the foundation (root) of the PCI Express. The CPU 410 connects with the PCI Express through the root complex 420.

The EE Host engine 430 expands PCI Express over Ethernet. That is, the EE Host engine 430 connects with the EE IO engine 440 via the L2 switch 470.

The EE IO engine 440 connects with the EE Host engine 430 via the L2 switch 470. Thus, the EE IO engine 440 extends the connection destination of the IO device 460 to the L2 switch 470.

The IO device 460 is a typical input/output device. The IO device 460 includes, for example, a PCI Express interface.

On the basis of such a configuration, the information processing system 40 realizes a connection between the CPU 410 and the IO device 460 via the L2 switch 470.

The CPU 411, the root complex 421, and the EE Host engine 431 operate in the same way as the CPU 410, the root complex 420, and the EE Host engine 430, respectively. Further, the EE IO engine 441 and the IO device 461 operate in the same way as the EE IO engine 440 and the IO device 460 respectively. As the result, the information processing system 40 realizes a connection between the CPU 411 and the IO device 461 via the L2 switch 470.

The EE Host engine 430 and the IO device 460 shown in FIG. 4 have VLAN ID=#0 as an identifier. Likewise, the EE Host engine 431 and the IO device 461 have VLAN ID=#1 as an identifier.

Therefore, the EE Host engine 430 connects with the EE IO Engine 440 that is connected with the IO device 460, while not connecting with the EE IO engine 441 that is connected with the IO device 461. On the other hand, the EE Host engine 431 connects with the EE IO Engine 441 that is connected with the IO device 461, while not connecting with the EE IO engine 440 that is connected with the IO device 460. As the result, the CPU 410 and the CPU 411 independently connect with the IO device 460 and IO device 461 respectively.

It is supposed that the CPU 410 uses a plurality of IO devices 460. In such a case, the information processing system 40 is required to provide an EE IO engine 440 for each IO device 460. That is, when increasing the number of IO devices 460, the technique described in Patent Literature 1 requires EE IO engines 440 corresponding to the respective IO devices 460.

However, PCI express can use a PCI Express switch (hereinafter, referred to as PCIe switch) as a device for expanding the number of ports.

FIG. 5 is a block diagram illustrating an example of the configuration of an information processing system 41 which includes PCIe switches, EE Host engines, and EE IO engines.

In FIG. 5, the PCIe switch 450 connects the EE IO engine 440 with two IO devices 460. In the same way, the PCIe switch 451 connects the EE IO engine 441 with two IO devices 461. As the result, the CPU 410 can connect with two IO devices 460 using one EE IO engine 440. Likewise, the CPU 411 can connect with two IO devices 461 using one EE IO engine 441.

SUMMARY

However, in FIG. 5, the EE Host engine 430 can connect with the EE IO engine 440 that has the same identifier as the EE Host engine 430, yet, cannot connect with the EE IO engine 441 that has a different identifier. Likewise, the EE Host engine 431 can connect with the EE IO engine 441, yet, cannot connect with the EE IO engine 440.

Thus, the information processing system 41 requires at least one EE IO engine for each VLAN. In other words, in the technique described in Patent Literature 1, EE IO engines of the same number as VLANs are required.

Moreover, the EE IO device requires hardware, as described above.

Therefore, the technique described in Patent Literature 1 requires additional hardware with an increase in the number of independently operating connections, such as VLANs, which raises a problem of increasing costs.

The objective of the present invention is to provide an information processing system, an information processing method, and a recording medium, which allows connections, even if the number of independently operating connections increases, without increasing the number of compositions that work for input/output devices.

An information processing system according to an aspect of the present invention includes: a plurality of processing units which perform predetermined processing; a plurality of input/output units, each of which performs input and/or output processing under the control of any one of the processing units; a plurality of first connection units, each of which connects one of the processing units to a first communication channel corresponding to the processing unit; a second connection unit which connects the plurality of input/output units to a second communication channel; a first mediating unit which mediates the second communication channel and a communication network, and transmits identifiers of the plurality of input/output units via the communication network; and a plurality of second mediating units, each of which respectively mediates a connection between the communication network and the first communication channel, receives the identifier transmitted to the communication network, and, when an identifier of its own is included in the received identifiers, establishes a connection between the input/output unit corresponding to the identifier of its own and the processing unit via the first mediating unit and detaches connections between the input/output unit corresponding to identifier different from the identifier of its own and the processing unit.

An information processing method according to an aspect of the present invention is for an information processing system. The system includes: a plurality of processing units which perform predetermined processing; a plurality of input/output units, each of which performs input and/or output processing under the control of any one of the processing units; a plurality of first connection units, each of which connects one of the processing units to a first communication channel corresponding to the processing unit; a second connection unit which connects the plurality of input/output units to a second communication channel; a first mediating unit which mediates a connection between the second communication channel and a communication network; and a plurality of second mediating unit, each of which respectively mediates a connection between the communication network and the first communication channel. The method includes: by the first mediating unit, transmitting identifiers of the plurality of input/output units via the communication network; and by the second mediating unit, receiving the identifiers transmitted to the communication network, and, when an identifier of its own is included in the received identifiers, establishing a connection between the input/output unit and the processing unit corresponding to its own identifier via the first mediating unit and detaching connections between the input/output unit corresponding to identifier different from the identifier of its own and the processing unit.

A computer readable non-transitory recording medium according to an aspect of the present invention embodies a program. The program causes an information processing system to perform a method. The system includes: a plurality of processing units which perform predetermined processing; a plurality of input/output units, each of which performs input and/or output processing under the control of any one of the processing units; a plurality of first connection units, each of which connects one of the processing units to a first communication channel corresponding to the processing unit; a second connection unit which connects the plurality of input/output units to a second communication channel; a first mediating unit which mediates a connection between the second communication channel and a communication network; and a plurality of second mediating unit, each of which respectively mediates a connection between the communication network and the first communication channel. The method includes: by the computer as the first mediating unit, transmitting identifiers of the plurality of input/output units via the communication network; and by the computer as the second mediating unit, receiving the identifiers transmitted to the communication network, and, when an identifier of its own is included in the received identifiers, establish a connection between the input/output unit corresponding to its own identifier and the processing unit via the first mediating unit and detach connections between the input/output unit corresponding to identifier different from the identifier of its own and the processing unit.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
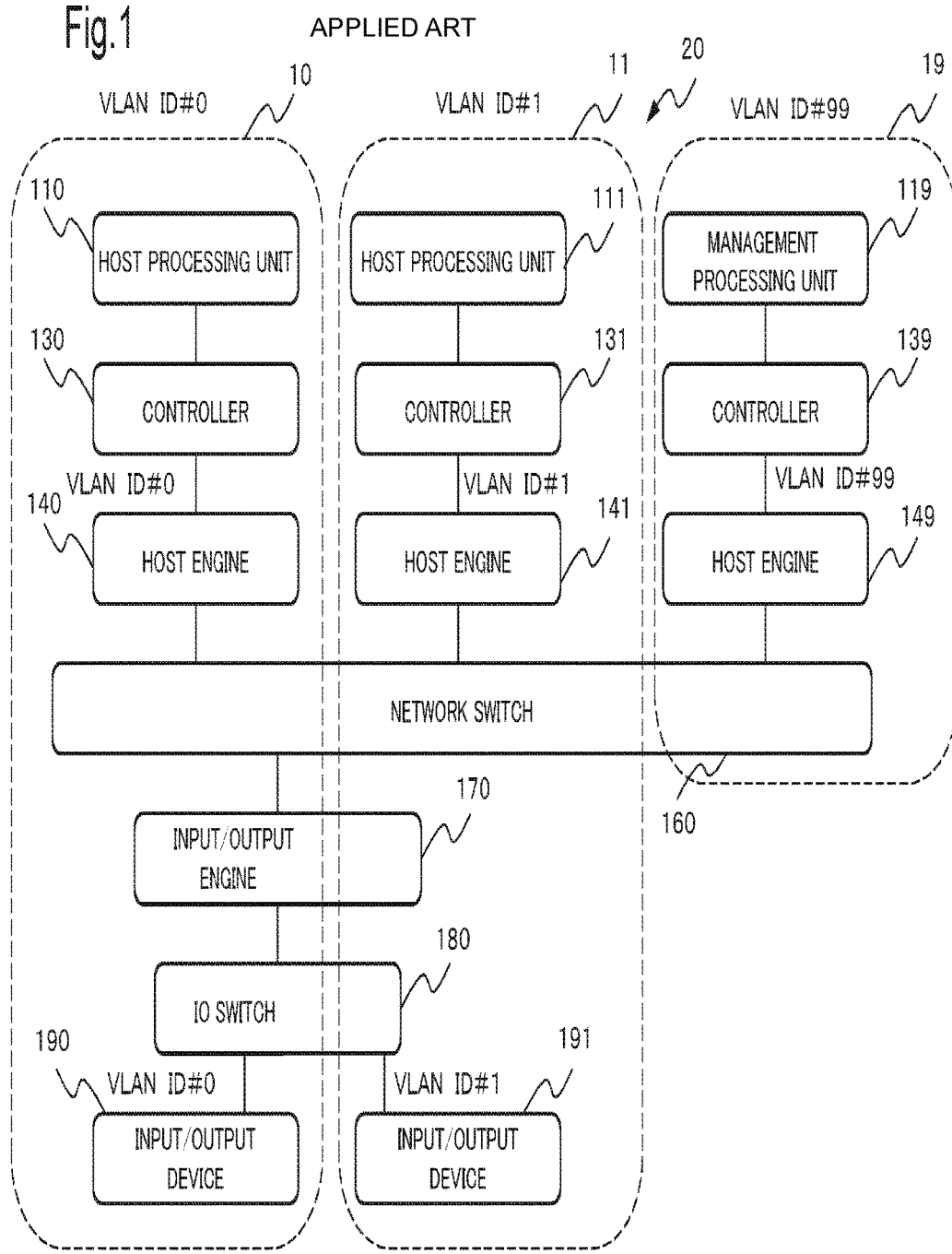
FIG. 1 is a block diagram illustrating an example of the configuration of an information processing system according to a first exemplary embodiment of the present invention.

The following will describe the exemplary embodiment of the present invention with reference to the drawings.

The drawings are provided for illustration of the exemplary embodiment of the present invention. However, the present invention is not limited to the description of the drawings. Further, like numerals are appended to like components throughout the drawings, thus, repetition of the description of such components will occasionally be omitted. Further, in the drawings used in relation to the following description, the compositions of parts that are irrelevant to the description of the present invention may be omitted and may not be shown.

An information processing system according to the exemplary embodiment of the present invention is, as long as the information processing system manages resources, not particularly limited for the structure and operation. In the following description, however, ExpEther (registered trademark) is used as an example.

Further, the following description uses a VLAN that is a virtual network as an example of a connection. However, the connection of the exemplary embodiment is not limited to a VLAN. The connection of the exemplary embodiment is not particularly limited, as long as the connection uses an identifier.

In the exemplary embodiment, the VLAN may be a typical VLAN without a need to be a special VLAN. As such, detailed descriptions of the VLAN will be omitted. Further, as the setting of the VLAN does not require any particular processing, detailed descriptions will be omitted for the setting of the VLAN. It is supposed that the setting of the VLAN has been set beforehand. The values of the identifiers of the VLANs (VLAN ID) in the following description are examples.

First Exemplary Embodiment

An information processing system 20 according to the first exemplary embodiment of the disclosed subject matter will be described with reference to the drawings.

[Description of the Configuration]

First, the configuration of the information processing system 20 according to the first exemplary embodiment will be described.

FIG. 1 is a block diagram illustrating an example of the configuration of the information processing system 20 according to the first exemplary embodiment of the present invention.

As shown in FIG. 1, the information processing system 20 includes two virtual networks (VLAN 10 and VLAN 11) that are connections respectively using each of two resources, an input/output device 190 and an input/output device 191. Hereinafter, the VLAN 10 and the VLAN 11 are occasionally referred to respectively as the first virtual network and the second virtual network, or the first connection and the second connection. However, the information processing system 20 may also include three or more virtual networks as virtual networks that are connections using resources.

Further, the information processing system 20 includes a VLAN 19 as a connection for resource management. However, in the information processing system 20, any one of the virtual networks using each of the resource (VLAN 10 or VLAN 11 in FIG. 1) may perform the function as the VLAN 19 for resource management.

As shown in FIG. 1, the virtual networks (VLAN 10 and VLAN 11) respectively establish connections via the network switch 160.

The network switch 160, as will be described in the following description, is not particularly limited as long as the host engines and the input/output engine can be connected. The network switch 160 may be, for example, an L2 switch using Ethernet (registered trademark). Alternatively, the network switch 160 may be, without limitation to a switch, a network device that is used for a LAN or the Internet as long as identifiers can be communicated as will be described below. Further, the network switch 160 may not be a single device, yet, may be a network configured with a plurality of devices. For such a reason, detailed descriptions of the network switch 160 will not be omitted.

As described above, the network switch 160 may be a communication network (network) without limitation to a separate switch. As such, the network switch 160 is also herein referred to as a communication network (network) including cases in which the network switch is a separate device.

Next, the configuration of a virtual network (VLAN) representing each connection will be described.

The VLAN 10 includes a host processing unit 110, a controller 130, and a host engine 140. An identifier of the VLAN 10 (VLAN ID) is defined as "#0". That is, the host engine 140 has "VLAN ID #0" as an identifier.

The host processing unit 110, as a host, executes predetermined processing using the input/output device 190. That is, the host processing unit 110 is a processing unit that executes predetermined processing. The host processing unit 110 is configured, for example, based on a circuit including a CPU, a peripheral LSI (Large Scale Integrated circuit), and a storage device (a memory).

The controller 130 connects the host processing unit 110 to a predetermined communication channel (bus). The controller 130 is, for example, a root complex of PCI Express (registered trademark). Alternatively, the controller 130 is an LSI or a circuit that connects the host processing unit 110 to a predetermined communication channel (bus). In other words, the controller 130 is a connection unit (a first connection unit) that connects the host processing unit 110 to a predetermined communication channel (bus). This communication channel is a communication channel (a first communication channel) between the controller 130 and the host engine 140.

The host engine 140 mediates a connection between the controller 130 and the network switch 160. The host engine 140, for example, as an EE Host engine of ExpEther, realizes a function of connecting PCI Express and Ethernet. Alternatively, the host engine 140 is an LSI or a circuit that connects a predetermined communication channel (bus) and a predetermined communication network (network). Thus, the host engine 140 is a mediating unit (a second mediating unit) that mediates a connection between a predetermined communication channel (bus) and a predetermined communication network (network). However, the host engine 140 of the first exemplary embodiment performs connection and detachment operation based on an identifier as will be described below.

The host processing unit 110 is connected to the network switch 160 via the controller 130 and the host engine 140. As such, the host processing unit 110 can execute input/output processing without the need of recognizing the network switch 160.

The VLAN 11 includes a host processing unit 111, a controller 131, and a host engine 141. The identifier of VLAN 11 (VLAN ID) is defined as "#1". That is, the host engine 141 has "VLAN ID #1" as an identifier.

The host processing unit 111, as a host, executes processing using the input/output device 191. That is, the host processing unit 111 is a processing unit in the same way as the host processing unit 110. The host processing unit 111 is configured, for example, based on a circuit including a CPU, a peripheral LSI, and a storage device (a memory).

The controller 131 connects the host processing unit 111 to a predetermined communication channel (a bus). The controller 131 is, for example, a root complex of PCI Express. Alternatively, the controller 131 is an LSI or a circuit that connects the host processing unit 111 to a predetermined bus. That is, the controller 131 is a connection unit (a first connection unit) in the same way as the controller 130. This communication channel is a communication channel (a first communication channel) between the controller 131 and the host engine 141.

The host engine 141 mediates a connection between the controller 131 and the network switch 160. The host engine 141, for example, as an EE Host engine of ExpEther, realizes a function of connecting PCI Express and Ethernet. Alternatively, the host engine 141 is an LSI or a circuit that connects a predetermined communication channel (bus) and a predetermined communication network (network). Thus, the host engine 141 is a mediating unit (a second mediating unit) in the same way as the host engine 140. However, the host engine 141 of the first exemplary embodiment performs connection and detachment operation based on an identifier as will be described below.

The host processing unit 111 is connected to the network switch 160 via the controller 131 and the host engine 141. As such, the host processing unit 111 can execute input/output processing without the need of recognizing the network switch 160.

The VLAN 19 includes a management processing unit 119, a controller 139, and a host engine 149. The identifier of the VLAN 19 (VLAN ID) is defined as "#99". That is, the host engine 149 has "VLAN ID #99" as an identifier. As will be described later, this identifier (VLAN ID #99) is an example of an identifier for resource management.

The management processing unit 119 performs processing of managing the input/output device 190 and the input/output device 191 as resources. In other words, the management processing unit 119 is a management unit. The management processing unit 119 is configured, for example, based on a circuit including a CPU, a peripheral LSI, and a storage device (a memory).

The controller 139 connects the host processing unit 119 to a predetermined communication channel (bus). The controller 139 is, for example, a root complex of PCI Express. Alternatively, the controller 139 is an LSI or a circuit that connects the management processing unit 119 to the predetermined communication channel (bus). That is, the controller 139 is a connection unit (a first connection unit) in the same way as the controller 130 and the controller 131. This communication channel is a communication channel (a first communication channel) between the controller 139 and the host engine 149.

The host engine 149 mediates a connection between the controller 139 and the network switch 160. The host engine 149 is, for example, an EE Host engine of ExpEther. Alternatively, the host engine 149 is an LSI or a circuit that connects a predetermined communication channel (bus) and a predetermined communication network (network). That is, the host engine 149 is a mediating unit (a second mediating unit) in the same way as the host engine 140 and the host engine 141.

The management processing unit 119 is connected to the network switch 160 via the controller 139 and the host engine 149. As such, the management processing unit 119 can execute input/output processing without the need of recognizing the network switch 160.

The management processing unit 119 only has to transmit identifiers to the input/output engine 170, as will be described later. Accordingly, the management processing unit 119 may otherwise be connected to the input/output engine 170 via a communication channel or a communication network, which is not shown, without through the network switch 160. In such a case, the information processing system 20 does not have to include the controller 139 or the host engine 149.

The VLAN 10 includes an input/output engine 170, an IO switch 180 and an input/output device 190. Also, the VLAN 11 includes the input/output engine 170, the IO switch 180, and an input/output device 191.

The input/output device 190 is an input device or an output device that performs input or output processing under the control of the host processing unit 110. The input/output device 191 is an input device or an output device that performs input or output processing under the control of the host processing unit 111. That is, the input/output device 190 and the input/output device 191 are resources. Each of the input/output device 190 and the input/output device 191 is, for example, an input device or an output device equipped with PCI Express. Alternatively, each of the input/output device 190 and the input/output device 191 is, for example, an input device or output device that is connected through a predetermined communication channel (bus). That is, each of the input/output device 190 and the input/output device 191 is an input/output unit that processes input or output under the each control of the host processing unit 110 and the host processing unit 111. Each of the input/output device 190 and the input/output device 191 may be a device including both input and output functions without limitation to an input device or an output device. As such, in the description of the first exemplary embodiment, input and output are referred to as input/output without distinction.

The IO switch 180 connects the input/output device 190 and input/output device 191 with the input/output engine 170. The IO switch 180 may be, for example, a PCI Express switch that is used for a connection of a typical input/output device. In this way, the IO switch 180 is a switch for increasing the number of connections in a predetermined communication channel (bus). That is, the IO switch 180 is a connection unit (a second connection unit) that connects a plurality of input/output devices to a predetermined communication channel (bus). This communication channel is a communication channel (a second communication channel) between the IO switch 180 and the input/output engine 170.

The input/output engine 170 mediates a connection between the network switch 160 and the IO switch 180. The input/output engine 170, for example, as an EE IO engine of ExpEther, realizes a function of connecting PCI Express and Ethernet. Alternatively, the input/output engine 170 is an LSI or a circuit that connects a predetermined communication network (network) and a predetermined communication channel (bus). Thus, the input/output engine 170 is a mediating unit (a first mediating unit) that mediates a predetermined communication channel (bus) and a predetermined communication network (network). However, the input/output engine 170 of the first exemplary embodiment can deal with a plurality of identifiers as identifiers of controlled input/output devices, as will be described later.

In the first exemplary embodiment, the communication channel (bus), to which the controller 130 is connected, and a communication channel (bus), to which the IO switch 180 is connected, may be different in physical and/or logical specification. However, in the following description, the communication channel (bus), to which the controller 130 is connected, and a communication channel (bus), to which the IO switch 180 is connected, have the same specification (for example, PCI Express). In such a case, the host engine 140 and the input/output engine 170 extend the connection between the controller 130 and the IO switch 180 via a bus to a connection via the network switch 160.

[Description of Operation]

The following will describe the operation of the information processing system 20.

In the following description, identifiers are set, in advance, for the host engine 140, the host engine 141, the input/output device 190, and the input/output device 191. Further, identifiers are set for the management processing unit 119 and the input/output engine 170 for resource management as will be described later. The method of setting these identifiers is not particularly limited. For example, an administrator of the information processing system 20 may set the identifiers in advance. Alternatively, the manufacturer may set the identifiers at the time of shipment from the factory.

First, operation of allocating the identifiers of the resources (the input/output device 190 and the input/output device 191) (hereinafter, referred to as VLAN ID) to the input/output engine 170 will be described. In particular, the following will describe resource management processing where the management processing unit 119 manages the resources (the input/output device 190 and the input/output device 191).

First, the management processing unit 119 sets an identifier (hereinafter, defined as VLAN ID #99 as an example) for resource management for a host engine 149 that is connected to the management processing unit 119 via the controller 139.

Here, an identifier for resource management is different from identifiers of any other resources and is connectable with the input/output engine 170, to which controlled resources are connected.

The host engine 149 ensures a connection with the input/output engine 170 using the identifier for resource management. Using this connection enables the management processing unit 119 to connect with the input/output device 190 and the input/output device 191. That is, the management processing unit 119 connects with the input/output engine 170, under the control of which the resources as objects to be managed are connected, using the identifier that is different from the identifiers of the resources.

The above operation is operation when the management processing unit 119 connects with the input/output engine 170, under the control of which the resources as objects to be managed are connected, via the network switch 160. In such a case, if the management processing unit 119 uses an identifier that is the same as a resource, the operation for management by the management processing unit 119 and the normal operation by the host processing unit 110 or the host processing unit 111 may possibly be mixed up. For that reason, the management processing unit 119 uses the identifier for resource management. This is also to prevent unauthorized operation in processing of changing an identifier, as will be described later.

However, as has been already described, the management processing unit 119 may be connected to the input/output engine 170 using a path that is different from the network switch 160. In such a case, the management processing unit 119 may realize a connection with the input/output engine 170 using a procedure according to the specification of the path.

Hereinafter, inclusive of cases of using a different path, the connection between the management processing unit 119 and the input/output engine 170 is referred to as a "connection for management."

At this point, the input/output engine 170 has not been registered the identifiers of the controlled input/output device 190 and input/output device 191. Thus, the host engine 140 and the host engine 141 have not been enabled to connect with the input/output engine 170.

Next, the management processing unit 119 reads information relating to the identifiers of the input/output device 190 and input/output device 191 via the IO switch 180 and the input/output engine 170. That is, the management processing unit 119 acquires the identifiers of the resources using the connection for management.

Then, the management processing unit 119 registers the identifiers allocated to the input/output device 190 and input/output device 191 (VLAN ID #0 and VLAN ID #1) with the input/output engine 170. That is, the management processing unit 119 registers the identifiers of the resources with the input/output engine 170 using the connection for management. The management processing unit 119 registers the identifiers of the controlled resources (for example, "VLAN ID #0" and "VLAN ID #1") with the input/output engine 170. The management processing unit 119 may otherwise register the identifiers of a part of the controlled resources with the input/output engine 170.

Thus, at this point, the input/output engine 170 is registered the identifiers of the controlled input/output device 190 and input/output device 191.

Based on the above operation, the management processing unit 119 registers (allocates) the identifiers corresponding to the input/output device 190 and input/output device 191 with the input/output engine 170.

The following will describe the operation of the information processing system 20 after allocation of the identifiers to the input/output engine 170. That is, operation of establishing a connection between the host processing unit 110 and the input/output device 190 as well as a connection between the host processing unit 111 and the input/output device 191 will be described.

The input/output engine 170 notifies the host engines of the identifiers that are allocated to the resources that are connected under the control of the input/output engine 170 via the network switch 160. In this case, the input/output engine 170 notifies the host engine 140 and the host engine 141 of the identifiers allocated to the input/output device 190 and input/output device 191 (VLAN ID #0 and VLAN ID #1).

The host engine 140 and the host engine 141 respectively determine whether the identifiers notified by the input/output engine 170 include an identifier matching the identifier that is set for itself.

In this case, the identifiers of the host engine 140 and host engine 141 are both included in the notified identifiers. Then, the host engine 140 and the host engine 141 connect with the input/output engine 170. That is, the host engine 140 and the host engine 141 establish a connection respectively with the input/output device 190 and the input/output device 191. The host engine 140 and the host engine 141 establish a connection, for example, using a hot plug function.

Then, after connecting with the input/output engine 170, the host engine 140 logically detaches the input/output device 191, to which is allocated a different identifier (VLAN ID #1) from the identifier of its own (VLAN ID #0). That is, the host engine 140 detaches the input/output device 191 from the host processing unit 110. The host engine 140 performs the detachment, for example, using a hot plug function.

Likewise, after connecting with the input/output engine 170, the host engine 141 logically detaches the input/output device 190, to which is allocated a different identifier (VLAN ID #0) from the identifier of its own (VLAN ID #1). That is, the host engine 141 detaches the input/output device 190 from the host processing unit 111. The host engine 141 performs the detachment, for example, using a hot plug function.

In this way, the input/output engine 170 notifies the host engines (for example, the host engine 140 and the host engine 141) of the identifiers of the input/output devices (for example, the input/output device 190 and the input/output device 191) that are connected under the control of the input/output engine 170.

Each host engine (for example, the host engine 140 and the host engine 141), if the notified identifiers include an identifier that is allocated to itself, establishes a connection with the input/output device via the input/output engine 170. Then, each host engine logically detaches connections with the input/output devices with identifiers that are not allocated to itself.

Based on such operation, the information processing system 20 can realize connections between a plurality of independently connected host processing units and input/output devices using one input/output engine 170 and one IO switch 180.

That is, the information processing system 20 can realize connections between host processing units and input/output devices based on one input/output engine 170 and one IO switch 180 even if the number of independently operating connections increases. In this way, the information processing system 20 can realize a plurality of connections without increasing components for input/output devices.

The following will further describe the operation of the information processing system 20 with reference to the drawings.

Figure 2:
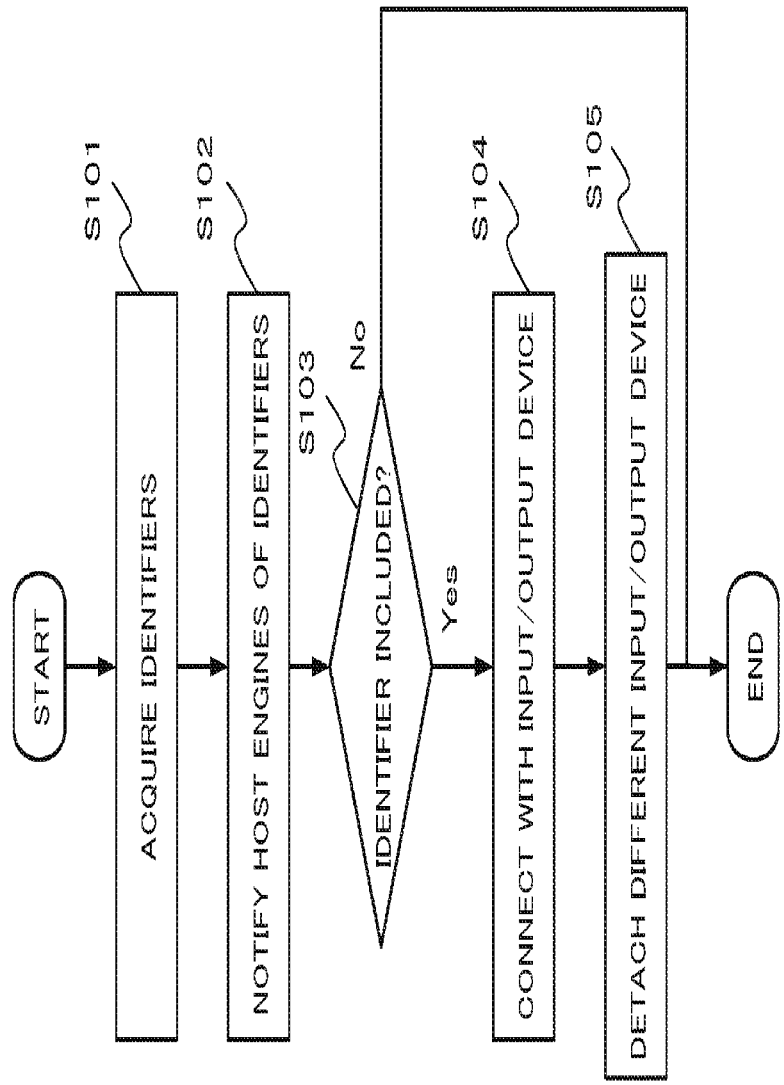
FIG. 2 is a flowchart illustrating an example of operation of the information processing system according to the first exemplary embodiment.

FIG. 2 is a flowchart illustrating an example of the operation of the information processing system 20 according to the first exemplary embodiment. The host engine 140 and the host engine 141 operate in the same way. Therefore, the following description will be made using the host engine 140.

The input/output engine 170 receives the identifiers of the controlled input/output devices (the input/output device 190 and the input/output device 191) from the management processing unit 119 that performs processing for resource management (operation S101). That is, the input/output engine 170 acquires the identifiers of resources. The input/output engine 170 may receive the identifiers of a part of the input/output devices, with which connections will be ensured, instead of all the identifiers of the controlled input/output devices.

The input/output engine 170 notifies the host engines (in FIG. 1, the host engine 140 and the host engine 141) of the received identifiers (operation S102).

Having received the notification, the host engine 140 determines whether or not the identifier of its own is included in the received identifiers (operation S103).

When the identifier of its own is not included (No at operation S103), the host engine 140 ends the processing.

When the identifier of its own is included (Yes at operation S103), the host engine 140 establishes a connection with the input/output device 190 via the input/output engine 170 and the IO switch 180 (operation S104). The host engine 140 realizes a connection, for example, using a hot plug function.

Then, the host engine 140 logically detaches the input/output device 191, to which a different identifier is allocated (operation S105). Specifically, the host engine 140 instructs the input/output engine 170 or the IO switch 180 for detachment. Then, the host engine 140 ends the processing.

When processing of all the host engines ended, the information processing system 20 ends the processing.

The information processing system 20 according to the first exemplary embodiment may switch the identifiers after acquiring the above-described connections. That is, the information processing system 20 may switch the connection.

The following will describe the operation of switching the connection of the information processing system 20 with reference to the drawings.

Figure 3:
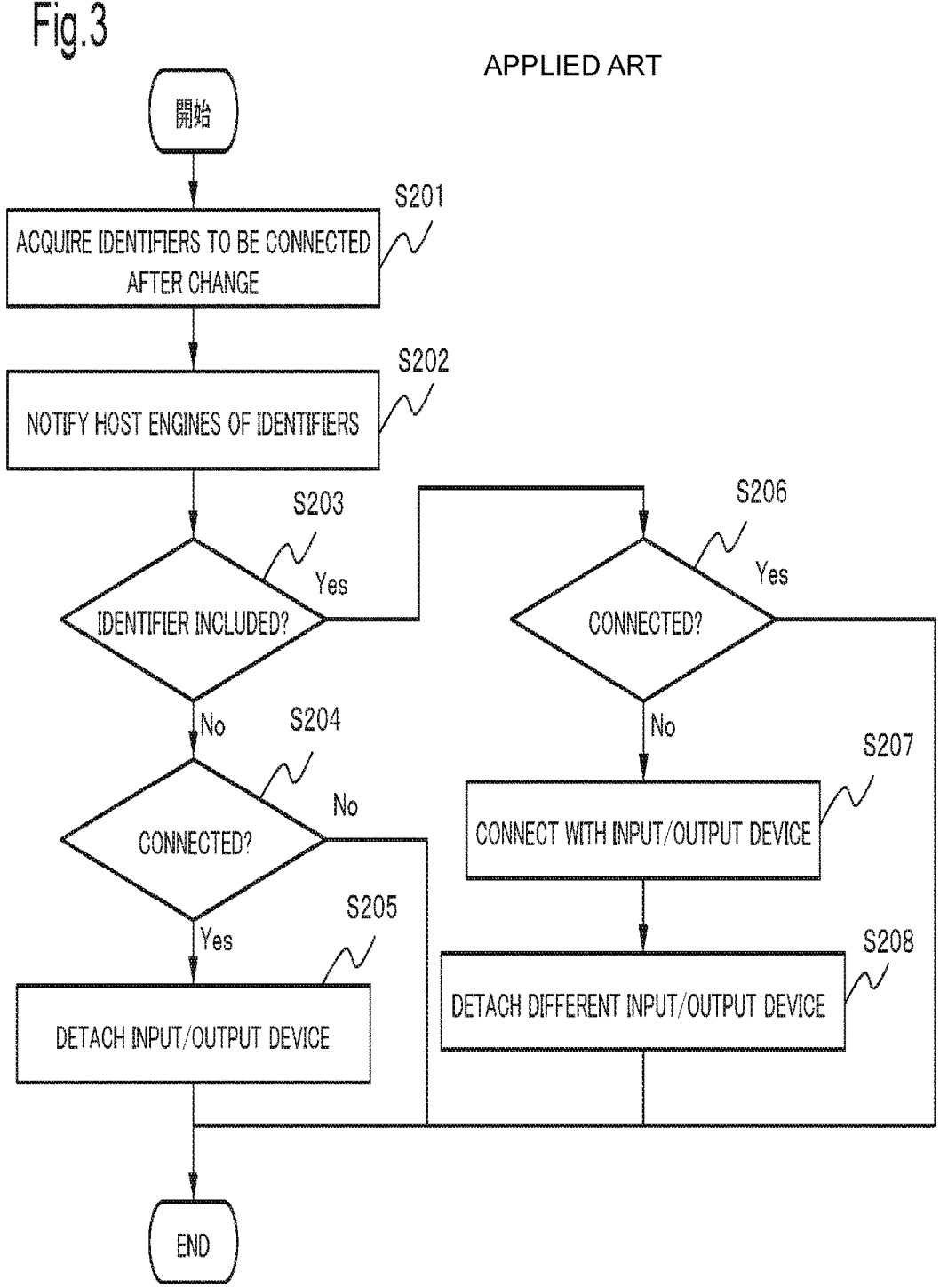
FIG. 3 is a flowchart illustrating an example of connection-switching operation in the information processing system according to the first exemplary embodiment.
Figure 4:
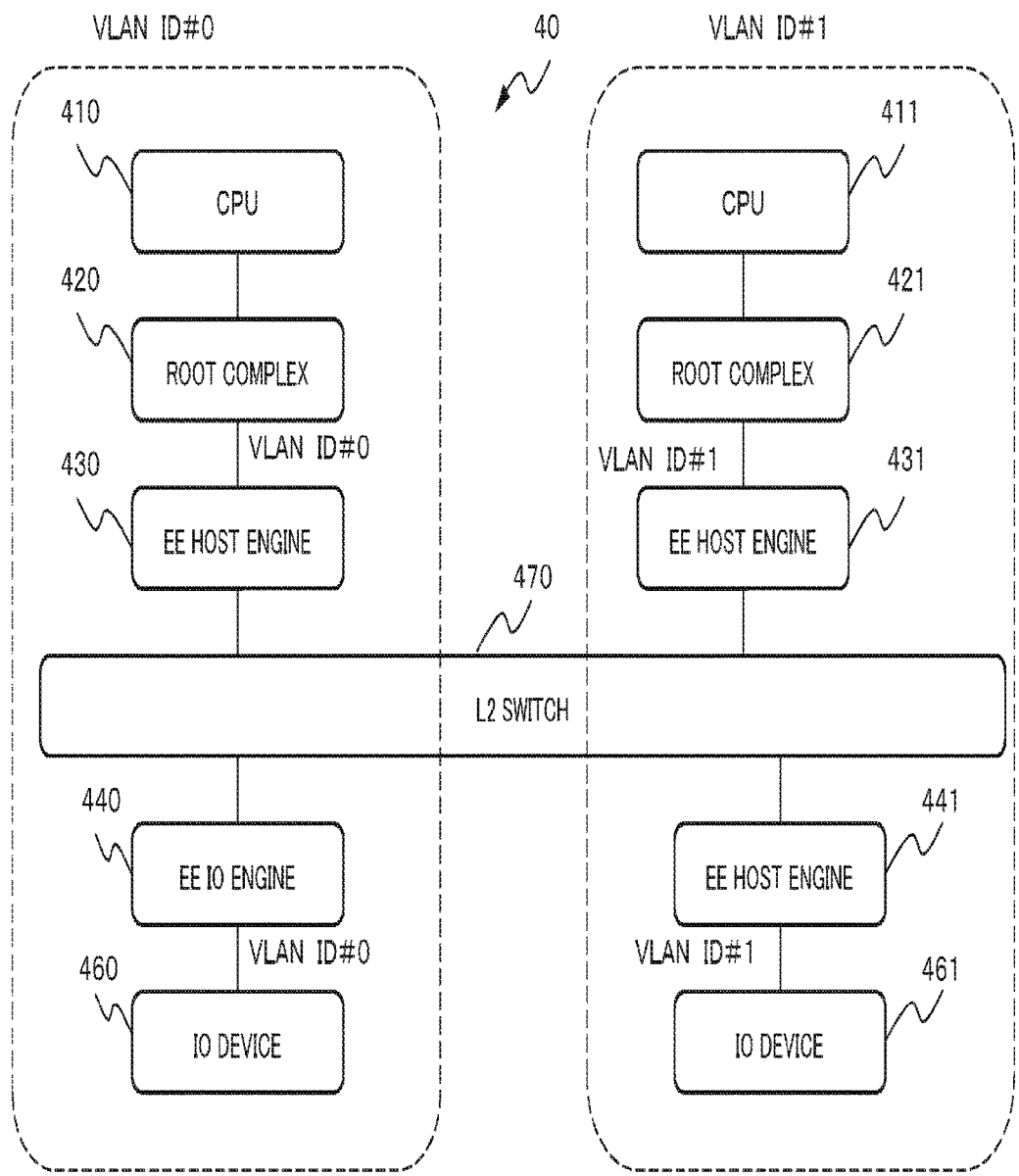
FIG. 4 is a block diagram illustrating an example of the configuration of an information processing system which includes EE Host engines and EE IO engines.
Figure 5:
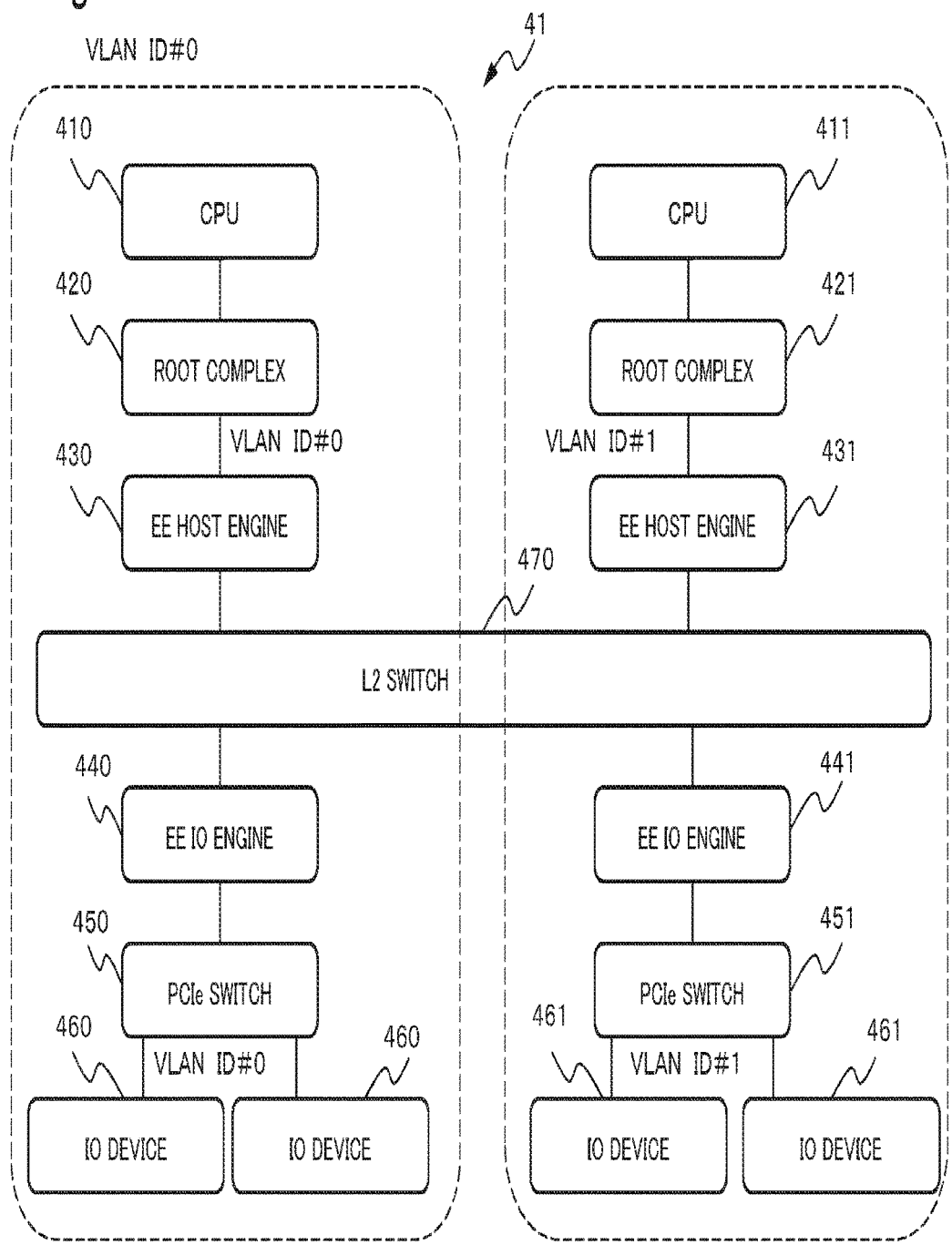
FIG. 5 is a block diagram illustrating an example of the configuration of an information processing system which includes PCIe switches, EE Host engines, and EE IO engines.

FIG. 3 is a flowchart illustrating an example of connection-switching operation in the information processing system 20 according to the first exemplary embodiment. The host engine 140 and the host engine 141 operate in the same way. Therefore, the following description will be made using the host engine 140.

The input/output engine 170 receives the identifier of input/output device, with which connections will be ensured after changing, from the management processing unit 119 that performs processing for resource management (operation S201). That is, the input/output engine 170 acquires the identifier to be connected after changing.

The input/output engine 170 notifies the host engines of the identifier to be connected after changing (operation S202).

The host engine 140 that received the notification determines whether or not the identifier of its own is included in the received identifiers (operation S203).

When the identifier of its own is included (Yes at operation S203), the host engine 140 determines whether or not the host engine 140 has a connection (operation S206).

When it has a connection (Yes at operation S206), the host engine 140 ends the processing.

When it has no connection (No at operation S206), the host engine 140 establishes a connection with the input/output device 190 in the same way as has been described with reference to FIG. 2. That is, the host engine 140 establishes a connection with the input/output device 190 via the input/output engine 170 and the IO switch 180 (operation S207). Then, the host engine 140 logically detaches the input/output device 191, to which a different identifier is allocated (operation S208). Then, the host engine 140 ends the processing.

The cases where the host engine 140 has no connection include cases where the host engine 140 has never connected and cases where the host engine 140 has detached a connection.

When the identifier of its own is not included (No at operation S203), the host engine 140 determines whether or not it has a connection (operation S204).

When the host engine 140 has no connection (No at operation S204), the host engine 140 ends the processing.

When the host engine 140 has a connection (Yes at operation S206), the host engine 140 detaches the input/output device 190 (operation S205). For example, the host engine 140 detaches the input/output device 190 using a hot plug function. Then, the host engine 140 ends the processing.

When all the host engines ended the processing, the information processing system 20 ends the processing.

Based on the above operation, the information processing system 20 can control connection and detachment between each host processing unit and each input/output device. That is, the information processing system 20 can change a connection between each host processing unit and each input/output device.

[Description of Effects]

The following will describe the effect of the first exemplary embodiment.

The information processing system 20 according to the first exemplary embodiment provides an effect of enabling a connection between a host processing unit and an input/output device for each of a plurality of independently operating connections using one input/output engine 170 and one IO switch 180. That is, the information processing system 20 can provide an effect of enabling connections without increasing the number of components for input/output devices, even if the number of independently operating connections increases.

This is because of the following reason:

The input/output engine 170 of the first exemplary embodiment notifies the host engines of the identifiers of the controlled input/output devices. Each host engine, when the identifier allocated to the host engine is included in the notified identifiers, establishes a connection with the input/output device and detaches input/output devices with other identifiers. Thus, each host engine can ensure a connection with the input/output device based on one input/output engine 170 and one IO switch 180.

Further, the information processing system 20 provides an effect of enabling switching of a connection.

The reason is as follows: the input/output engine 170 notifies the host engines of the identifiers of the input/output devices to be connected after changing the connections. Each host engine, when the identifier allocated to the host engine is included in the notified identifiers and the host engine has no connection, establishes a connection with the input/output device and detaches input/output devices with other identifiers. Further, each host engine, when the identifier allocated to the host engine is not included in the notified identifiers and has a connection, detaches the connection. As such, the information processing system 20 can change connections using identifiers.

According to the embodiment of the present invention, an effect of enabling connections without increasing the number of components for input/output devices can be provided, even if the number of independently operating connections increases.

[Variation 1]

As has been previously described, the host processing unit 110 or the host processing unit 111 may operate as the management processing unit 119. In such a case, the information processing system 20 may not include the management processing unit 119, the controller 139, and the host engine 149 as physical compositions.

Alternatively, the input/output engine 170 may receive the identifiers of the input/output devices from a device for system management, not shown, included in the information processing system 20, instead of the management processing unit 119. In such a case, the information processing system 20 may not include the management processing unit 119, the controller 139, and the host engine 149 as physical compositions.

Alternatively, the input/output engine 170 may detect the identifiers of the controlled input/output devices. That is, the input/output engine 170 may realize the function of the management processing unit 119. In such a case, the information processing system 20 may not include the management processing unit 119, the controller 139, and the host engine 149 as physical compositions.

That is, the way how the input/output engine 170 acquires the identifiers is not particularly limited.

Figure 6:
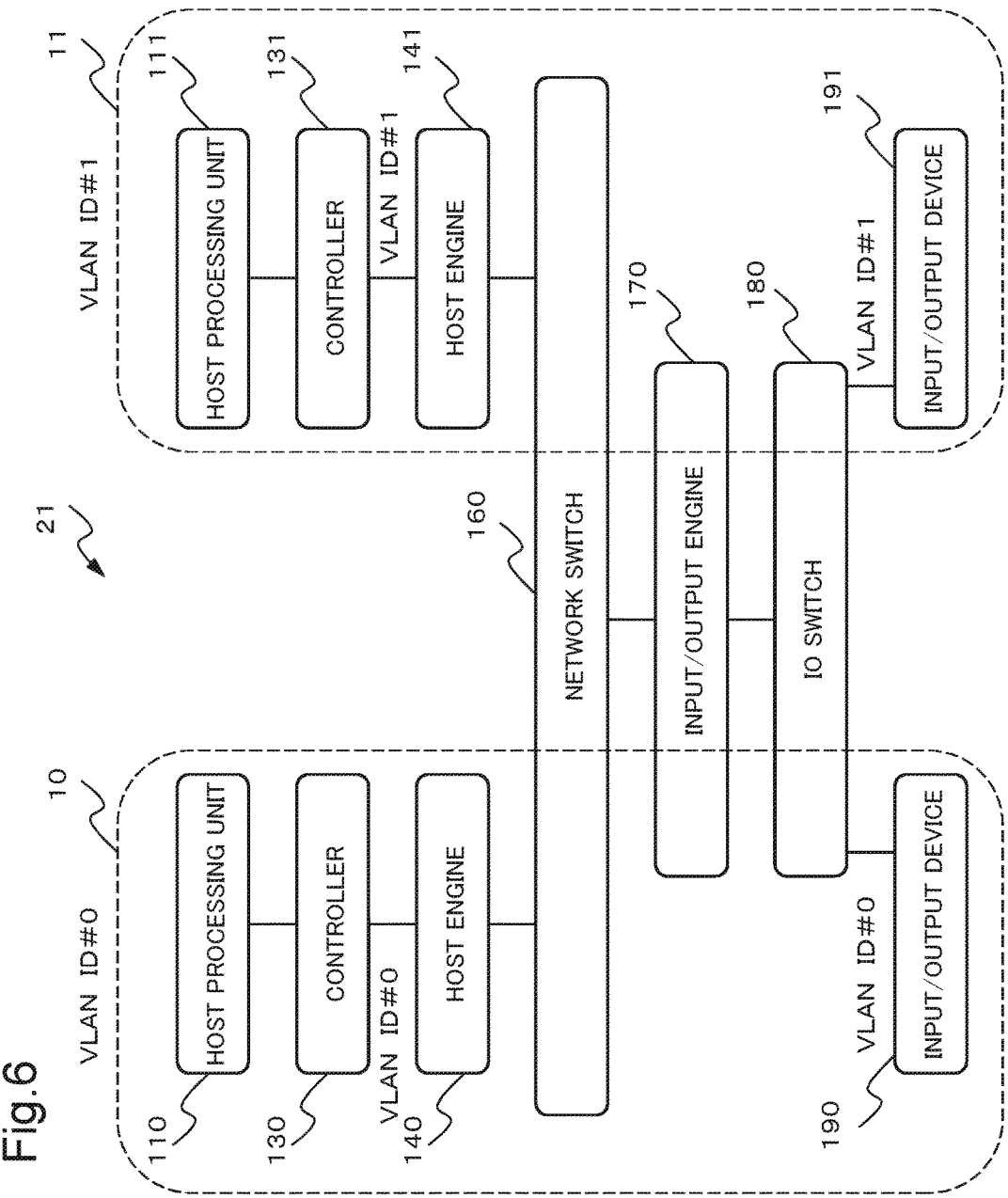
FIG. 6 is a block diagram illustrating another example of the configuration of the information processing system according to the first exemplary embodiment.

FIG. 6 is a block diagram illustrating an example of the configuration of the information processing system 21 when the information processing system 21 does not include the management processing unit 119, the controller 139, and the host engine 149 as physical compositions. The input/output engine 170 included in the information processing system 21 shown in FIG. 6 operates in the same way as the input/output engine 170 shown in FIG. 1, except for acquisition of identifiers. Further, the host engine 140 and the host engine 141 operate in the same way as the host engine 140 and the host engine 141 shown in FIG. 1. Thus, the information processing system 21 provides the same effect as the information processing system 20.

As has been previously described, the host processing unit 110 and the host processing unit 110 are "processing units". The input/output device 190 and the input/output device 191 are "input/output units". The controller 130 and the controller 131 are "first connection units". The IO switch 180 is "a second connection unit". The input/output engine 170 is "a first mediating unit". The host engine 140 and the host engine 141 are "second mediating units". The communication channel between the controller 130 and the host engine 140 and the communication channel between the controller 131 and host engine 141 are "first communication channels". The communication channel between the IO switch 180 and the input/output engine 170 is "a second communication channel". The network switch 160 is "a communication network".

FIG. 6 is the minimum configuration of the exemplary embodiment.

[Variation 2]

The above-described information processing system 20 is configured as follows.

For example, each component of the information processing system 20 may be configured as a hardware circuit.

Further, each component of the information processing system 20 may be configured using a plurality of devices that are connected via a bus and a network.

Further, a plurality of components of the information processing system 20 may be configured as a single hardware circuit.

Further, the information processing system 20 may be realized, for at least a part of the components, as a computer device that includes a CPU, a ROM (Read Only Memory), and a RAM (Random Access Memory). Here, the part of the components may be, for example, the host processing unit 110, the host engine 140, or the input/output engine 170. Further, the information processing system 20 may be realized as a computer device that includes, in addition to the above components, a peripheral interface circuit (PIC) and a network interface circuit (NIC). Further, the information processing system 20 may be realized as a computer device including, in addition to the above configuration, an input/output circuit (IOC).

Figure 7:
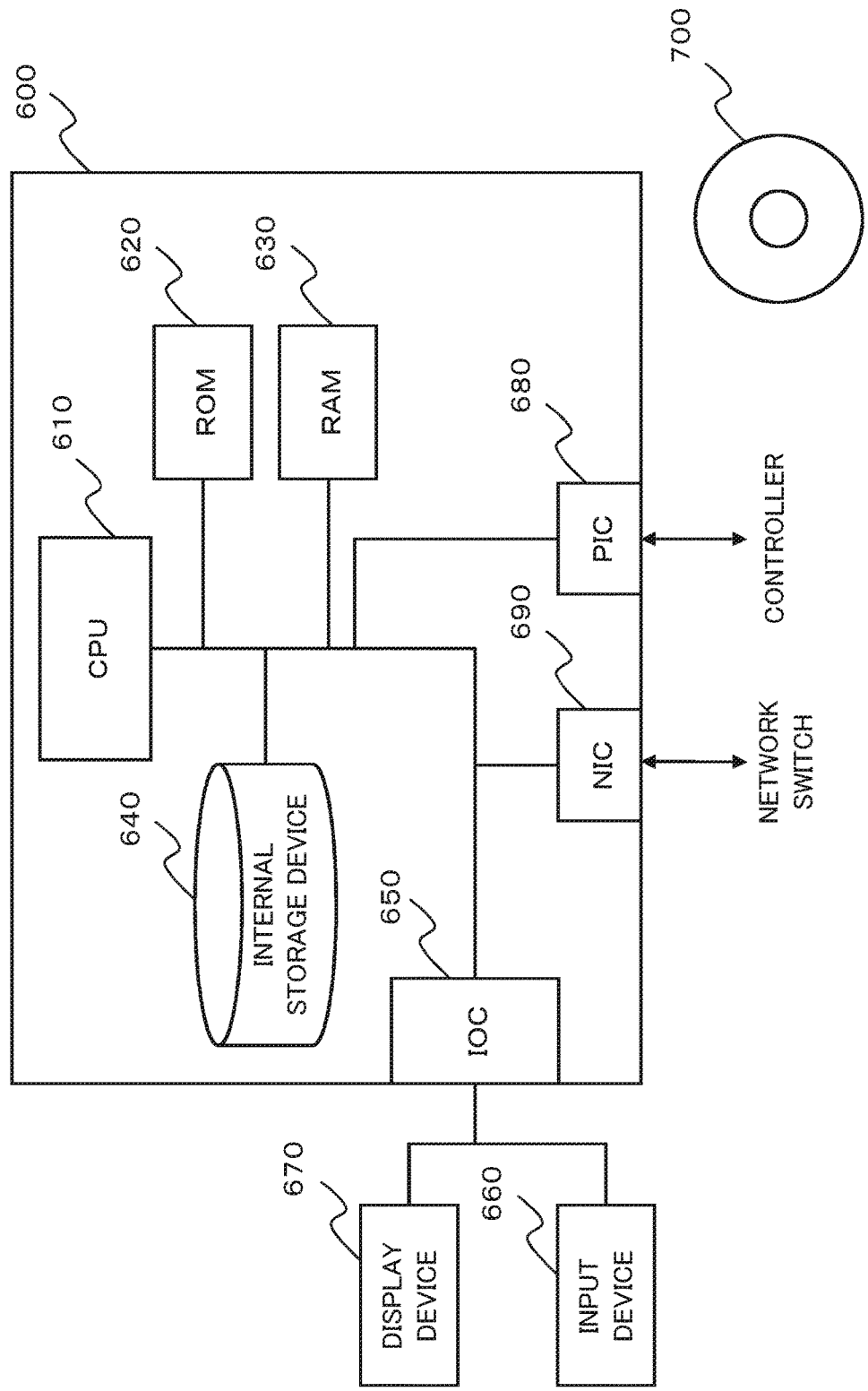
FIG. 7 is a block diagram illustrating an example of the configuration of a computer device which realizes the configuration of an information processing system according to the first exemplary embodiment.

FIG. 7 is a block diagram illustrating an example of the configuration of the information processing device 600 as a computer device which configures the components according to the second variant.

The information processing device 600 configures a computer device, including a CPU 610, a ROM 620, a RAM 630, an internal storage device 640, an IOC 650, a PIC 680, and an NIC 690.

The CPU 610 reads a program from the ROM 620. Then, the CPU 610, based on the read program, controls the RAM 630, the internal storage device 640, the IOC 650, the PIC 680, and the NIC 690. Then, the computer including the CPU 610 controls these compositions, thereby realizing each function of each component (for example, the host processing unit 110, the host engine 140, or the input/output engine 170) shown in FIG. 1.

The CPU 610 may use the RAM 630 or the internal storage device 640 as a temporary storage for the program when realizing each function.

Further, the CPU 610 may read the program included in a recording medium 700, which stores the program in a computer readable manner, using a recording medium reading device which is not shown. Alternatively, the CPU 610 may receive the program from an external device, not shown, via the PIC 680 or the NIC 690, store the program in the RAM 630, and operate in accordance with the stored program.

The ROM 620 stores the program and static data to be executed by the CPU 610. The ROM 620 is, for example, Programmable-ROM (P-ROM) or flash ROM.

The RAM 630 temporarily stores the program and data to be executed by the CPU 610. The RAM 630 is, for example, Dynamic RAM (D-RAM).

The internal storage device 640 stores the data and program that will be stored for long-term in the information processing device 600. Further, the internal storage device 640 may operate as a temporary storage device of the CPU 610. The internal storage device 640 is, for example, a hard disc device, a magneto-optical device, a Solid State Drive (SSD), or a disk array device.

Here, the ROM 620 and the internal storage device 640 are non-transitory recording mediums. On the other hand, the RAM 630 is a transitory recording medium. Then, the CPU 610 can operate according to a program stored in the ROM 620, internal storage device 640, or RAM 630. In other words, the CPU 610 can operate using a non-transitory recording medium or a transitory recording medium.

The IOC 650 mediates data between the CPU 610, the input device 660, and the display device 670. The IOC 650 is, for example, an IO interface card or a Universal Serial Bus (USB) card.

The input device 660 is a device that receives input instructions from an operator of the information processing device 600. The input device 660 is, for example, a keyboard, a mouse, or a touch panel.

The display device 670 is a device that displays information to the operator of the information processing device 600. The display device 670 is, for example, a liquid crystal display.

The PIC 680 relays data to/from components, which are not shown in FIG. 7 (for example, the controller 130 or the input/output device 190), via a predetermined communication channel (bus). The PIC 680 is, for example, a PCI Express card.

The NIC 690 relays data to/from components, which are not shown in FIG. 7 (for example, the network switch 160), via a predetermined communication network (network). The NIC 690 is, for example, an Ethernet card.

The information processing device 600 may include only one of the ROM 620 and the internal storage device 640. As another option, the information processing device 600 may include only one of the PCI 680 and the NIC 690. Further, the information processing device 600 may not include the IOC 650. For example, when the information processing device 600 realizes the function of the host processing unit 110 as a blade server, the information processing device 600 does not have to include the IOC 650 and the NIC 690.

The information processing system 20 including the information processing device 600 which is configured as such can provide the same effect as the information processing system 20 shown in FIG. 1.

This is because the CPU 610 of the information processing device 600 can realize the same functions as the components included in the information processing system 20 in accordance with the program.

The disclosed subject matter can be applied to an information processing system that manages connections with resources via a predetermined communication channel (bus) and a predetermined communication network (network) using the identifiers allocated to the resources.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An information processing system comprising:
a plurality of processing units which perform predetermined processing;
a plurality of input/output units, each of which performs input and/or output processing under the control of any one of the processing units;
a plurality of first connection units, each of which connects one of the processing units to a first communication channel corresponding to the processing unit;
a second connection unit which connects the plurality of input/output units to a second communication channel;
a first mediating unit which mediates the second communication channel and a communication network, and transmits identifiers of the plurality of input/output units via the communication network; and a plurality of second mediating units, each of which respectively mediates a connection between the communication network and the first communication channel, receives the identifier transmitted to the communication network, and, when an identifier of the second mediating unit is included in the received identifiers, establishes a connection between the input/output unit corresponding to the identifier of the second mediating unit and the processing unit via the first mediating unit and detaches connections between the input/output unit corresponding to identifier different from the identifier of the second mediating unit and the processing unit.

2. The information processing system according to claim 1,
wherein the first communication channel is a communication channel of the same specification as the second communication channel.

3. The information processing system according to claim 1,
wherein the first mediating unit transmits identifiers which are changed by changes in connections of the plurality of input/output units to the communication network; and
the second mediating unit receives the changed identifiers via the communication network, and, when the received identifiers do not include an identifier of its own, detaches the connection between the input/output unit corresponding to the identifier of its own and the processing unit.

4. The information processing system according to claim 3,
wherein the second mediating unit, when the received identifiers being changed include an identifier of its own and the second mediating unit has not established a connection between the input/output unit and the processing unit corresponding to the identifier of its own, establishes a connection between the input/output unit and the processing unit corresponding to the identifier of its own.

5. The information processing system according to claim 1, further comprising:
a management unit which notifies the first mediating unit of the identifiers of the plurality of input/output units.

6. The information processing system according to claim 5, further comprising:
a third connection unit which connects the management unit to a third communication channel; and
a third mediating unit which mediates a connection between the third communication channel and the communication network.

7. An information processing method for an information processing system, the system comprising:
a plurality of processing units which perform predetermined processing;
a plurality of input/output units, each of which performs input and/or output processing under the control of any one of the processing units;
a plurality of first connection units, each of which connects one of the processing units to a first communication channel corresponding to the processing unit;
a second connection unit which connects the plurality of input/output units to a second communication channel;
a first mediating unit which mediates a connection between the second communication channel and a communication network; and
a plurality of second mediating unit, each of which respectively mediates a connection between the communication network and the first communication channel,
the method comprising:
by the first mediating unit, transmitting identifiers of the plurality of input/output units via the communication network; and
by the second mediating unit, receiving the identifiers transmitted to the communication network, and, when an identifier of the second mediating unit is included in the received identifiers, establishing a connection between the input/output unit and the processing unit corresponding to the second mediating unit identifier via the first mediating unit and detaching connections between the input/output unit corresponding to identifier different from the identifier of the second mediating unit and the processing unit.

8. A computer readable non-transitory recording medium embodying a program, the program causing an information processing system to perform a method, the system comprising:
a plurality of processing units which perform predetermined processing;
a plurality of input/output units, each of which performs input and/or output processing under the control of any one of the processing units;
a plurality of first connection units, each of which connects one of the processing units to a first communication channel corresponding to the processing unit;
a second connection unit which connects the plurality of input/output units to a second communication channel;
a first mediating unit which mediates a connection between the second communication channel and a communication network; and
a plurality of second mediating unit, each of which respectively mediates a connection between the communication network and the first communication channel,
the method comprising:
by the computer as the first mediating unit, transmitting identifiers of the plurality of input/output units via the communication network; and
by the computer as the second mediating unit, receiving the identifiers transmitted to the communication network, and, when an identifier of the second mediating unit is included in the received identifiers, establish a connection between the input/output unit corresponding to the second mediating unit identifier and the processing unit via the first mediating unit and detach connections between the input/output unit corresponding to identifier different from the identifier of the second mediating unit and the processing unit.

* * * * *